US006456962B1

(12) United States Patent
Allingham et al.

(10) Patent No.: US 6,456,962 B1
(45) Date of Patent: Sep. 24, 2002

(54) INTERFACE TO NETWORK PROTOCOL SOFTWARE TO SUPPORT HARDWARE ACCELERATION OF CRITICAL FUNCTIONS

(75) Inventors: Jon Allingham, New City; Bruce Pietsch, Orangeburg; Roy McNeil, Warwick; Jae Park, Ossining, all of NY (US)

(73) Assignee: Fujitsu Network Communications, Inc., Richardson, TX (US)

( * ) Notice: Subject to any disclaimer, the term of this patent is extended or adjusted under 35 U.S.C. 154(b) by 0 days.

(21) Appl. No.: 09/325,186

(22) Filed: Jun. 3, 1999

(51) Int. Cl.[7] .......................... G06F 13/14; H04L 12/46
(52) U.S. Cl. .......................... 703/26; 703/27; 370/387; 370/395; 370/401
(58) Field of Search ...................... 703/26, 27; 370/395, 370/396, 401, 387, 389

(56) References Cited

U.S. PATENT DOCUMENTS

| 5,715,250 A | | 2/1998 | Watanabe | 370/395 |
|---|---|---|---|---|
| 5,751,698 A | | 5/1998 | Cushman et al. | 370/252 |
| 5,805,805 A | | 9/1998 | Civanler et al. | 395/200.5 |
| 5,828,665 A | * | 10/1998 | Husak | 370/387 |
| 5,909,441 A | * | 6/1999 | Alexander et al. | 370/395 |
| 5,949,783 A | * | 9/1999 | Husak et al. | 370/396 |
| 5,987,516 A | * | 11/1999 | Rao et al. | 709/227 |
| 6,064,675 A | * | 5/2000 | Alexander et al. | 370/401 |
| 6,198,747 B1 | * | 3/2001 | Bingham et al. | 370/401 |
| 6,205,490 B1 | * | 3/2001 | Karapetkov et al. | 709/249 |
| 6,240,462 B1 | * | 5/2001 | Agraharam et al. | 709/238 |

FOREIGN PATENT DOCUMENTS

| EP | 0 854 658 A2 | 7/1998 | H04Q/11/04 |
|---|---|---|---|
| EP | 0 866 630 A1 | 9/1998 | H04Q/11/00 |

OTHER PUBLICATIONS

Harris & Jefferies, "LAN Emulation Client Software (LEC)" Date Unknown.
ATM Forum Technical Committee, "LAN Emulation Over ATM Version 2—LUNI Specification" AF–LANE–0084.000, Jul. 1997.
Shikama et al., An Architecture for LAN Interconnection in B–ISDN, Canadian Conference on Electrical and Computer Engineering, XP000391542 pp. 55.2.1–55.2.5, Sep. 6, 1990.
Dorling et al., "Intenetworking over ATM, An Introduction", Prentice Hall, USA XP002154932, Section 1.2.1.2. and 2.1.4.

* cited by examiner

Primary Examiner—Hugh M. Jones
Assistant Examiner—Thai Phan
(74) Attorney, Agent, or Firm—Weingarten, Schurgin, Gagnebin & Lebovici LLP

(57) ABSTRACT

LAN interface logic (33) receives frames from a LAN segment (32), and frame transport logic (40, 54, 56) transfers frames to and from an ATM network. Forwarding logic (36) is used to (i) determine whether a mapping between a destination address (DA) and a virtual connection (VC) in the ATM network exists, (ii) forward frames containing a known DA to the frame transport logic for transfer to the ATM network, (iii) forward frames containing unknown DAs to the frame transport logic for transfer to a broadcast and unknown server (BUS 74) in the ATM network, and (iv) pass unknown DAs to a LAN emulation client (LEC) processor (42, FIG. 5) to resolve the address. The LEC processor creates a LAN emulation address resolution protocol (LE_ARP) request message containing the unknown DA, and the LE_ARP request message is transferred to a LAN emulation server (LES 76). The LES returns an ATM address of a remote LEC via which the destination node can be reached. The LEC processor uses the ATM address to establish a new VC to the destination node, and provides the DA-VC mapping to the forwarding logic for use in forwarding subsequently received frames.

8 Claims, 6 Drawing Sheets

INTERFACE TO NETWORK PROTOCOL SOFTWARE TO SUPPORT HARDWARE ACCELERATION OF CRITICAL FUNCTIONS

CROSS REFERENCE TO RELATED APPLICATIONS

Not Applicable

STATEMENT REGARDING FEDERALLY SPONSORED RESEARCH OR DEVELOPMENT

Not Applicable

BACKGROUND OF THE INVENTION

The present invention relates generally to the field of data networks, and in particular to techniques for emulating a Local Area Network (LAN) over a wide-area network (WAN) such as an Asynchronous Transfer Mode (ATM) network.

LAN emulation or LANE is a technique for providing data communication services between devices residing on different LAN segments that are interconnected by a long-distance or wide-area network (WAN). LANE effectively hides the underlying WAN network from the devices, and thus enables the devices to communicate using only their native LAN protocol. Several important benefits can be achieved using LANE, notably a measure of backwards compatibility. By supporting LANE, newer WAN networking equipment can successfully interoperate with devices having only LAN interfaces. Customer investments in LAN equipment can be protected, easing customer acceptance of newer networking technology.

One common environment in which LANE is used is in ATM-based networks. In ATM networks, data is transferred in the form of fixed-length cells along pre-established "Virtual Connections" or VCs. This operation is very different from the operation of most LANs. One widely used LAN protocol, for example, is the Ethernet protocol. Ethernet networks generally employ a broadcast transmission medium, such as a multi-drop coaxial cable or twisted conductor pairs. Data is sent in the form of frames, each of which includes a destination address identifying the network node to which the frame is being sent. All nodes are required to "listen" for transmissions that contain the address of the node as the destination address. The LANE mechanism in an ATM WAN is responsible for presenting appropriate interfaces to LAN segments connected by the WAN, and performing operations on behalf of the LAN devices using mechanisms available in the ATM network.

In particular, the LANE system is required to forward frames from one LAN segment to another across the WAN. The LANE system is responsible for learning the locations of LAN devices in the WAN, maintaining a set of mappings from LAN destination addresses to VCs by which the destination nodes can be reached, and using the mappings to forward frames through the WAN toward destination nodes. The process of learning the mappings from destination addresses to VCs is referred to as "address resolution". Another function performed by LANE is the flooding or broadcasting of frames containing "unknown" destination addresses (i.e., addresses identifying nodes whose physical locations in the WAN are unknown) to all possible destination LAN segments. Once a destination address becomes known, frames are unicast transmitted using the now-known physical address information. The LANE system is responsible for ensuring that destination nodes receive sequences of frames in the same order as sent by source nodes, even in the interval surrounding a transition from broadcast to unicast servicing.

A LANE configuration for ATM is described in a specification entitled "LAN Emulation over ATM Version 2—LUNI Specification", published by the ATM Forum as document number AF-LANE-0084.000, July 1997. An emulated LAN or ELAN includes a group of geographically separated LANs that communicate with each other over an ATM network. The ELAN is structured according to a client-server model. LAN emulation clients (LECs) communicate with various LAN servers to carry out LANE operation. Among the LAN servers are a LAN emulation server (LES), a Broadcast and Unknown Server (BUS), and a LAN Emulation Configuration Server (LECS).

The main function of a LEC is to forward data frames across the ELAN to a peer LEC on another LAN segment. As part of this function, the LEC must learn and maintain mappings between LAN addresses (such as MAC addresses) and ATM addresses of remote LECs via which LAN destinations can be reached.

The LES enables the LEC to join an ELAN and to request an address resolution service, commonly referred to as LAN emulation address resolution protocol or LE_ARP. The BUS provides data delivery service on behalf of the LECs for broadcast, multicast, and "unknown" frames (i.e., frames destined for nodes whose location in the network are not known to a service-requesting LEC). The LECS provides the LECs with configuration information such as the network address of the LES, an ELAN identifier value, and an allowed maximum frame size.

In one known configuration, a LAN emulation client includes standard LEC software that is combined with special-purpose hardware that is used to send and receive frames across the ELAN. The hardware includes segmentation and reassembly (SAR) logic for transporting the frames as groups of ATM cells on the ATM network. The hardware is responsible for the frame-forwarding function when the destination address is known, i.e., when the hardware has a valid mapping between the destination address of the frame and an ATM VC on which the frame should be forwarded to a remote LEC. The standard LEC software handles all control-related transactions, such as sending LE_ARP requests to the LES, and sending unknown data frames to the BUS for broadcasting to the other LAN segments in the ELAN. One known example of such standard LEC software is embodied in a product known as the Soft-ATM™ LEC Subsystem, available from Harris & Jeffries, Inc. of Dedham, Mass., USA.

BRIEF SUMMARY OF THE INVENTION

Prior LANE configurations such as described above have suffered from degraded performance under certain operating conditions, especially when the volume of received unknown frames (i.e., frames including destination addresses whose mapping to VCs is unknown) is high. This condition can occur during initialization, for example, or after re-configuration of a network access device that provides LANE functionality. It is desirable to attain overall better network performance in network access devices that provide LANE functionality, even during periods of initialization or reconfiguration.

In accordance with the present invention, LAN emulation apparatus and methods are disclosed in which the broadcasting of unknown frames is handled in hardware rather than software. This results in generally improved performance, especially during initialization periods in which many destination addresses are unknown. The hardware includes a special interface to LEC software for coordinating their respective functions, especially when a destination address is listed as unknown and when it has transitioned from unknown to known.

The apparatus includes LAN interface logic that receives frames from a LAN segment, and frame transport logic that transfers frames to and from a connection-based network such as ATM. Hardware forwarding logic is used to determine whether a mapping between the destination address (DA) of the frame and a destination VC in the connection-based network exists. Frames containing a known DA are passed to the frame transport logic for transfer to the connection-based network using the VC to which the destination address is mapped. For each frame containing an unknown DA, the unknown DA is passed to a LAN emulation client (LEC) processor used to establish a mapping for the unknown destination address. The frame is simultaneously passed to the frame transport logic to be transferred to a broadcast and unknown server (BUS) in the connection-based network used to broadcast the frame on the emulated LAN.

The LAN emulation client (LEC) processor participates in a LAN emulation address resolution protocol (LE_ARP) with a LAN emulation server (LES) in the network, which is responsible for maintaining the mappings between DAs and addresses of other LECs on other network nodes via which the DAs can be reached. The LEC processor creates an LE_ARP request message containing the unknown DA, and passes this message to the frame transport logic along with an identifier of a VC of the LES. The frame transport logic sends the request message on the indicated VC. The LES responds by returning the corresponding network address in an LE_ARP reply message, which is forwarded to the LEC processor by the frame transport logic upon receipt.

Upon receiving the LE_ARP reply message, the LEC processor determines whether a new connection to the network address is needed, and establishes one if necessary. The LEC processor provides the mapping between the now-known DA and the new or existing connection to the forwarding logic for use in forwarding subsequently received frames.

The disclosed LANE system employs standard LEC software such as the above mentioned Harris & Jeffries LEC software, along with custom interfaces to account for the functionality of the forwarding logic. A dual-SAR architecture is also used. One SAR handles real-time data traffic, while the other handles protocol control traffic. In the disclosed system, the ATM network relies on a Synchronous Transfer Mode (STM) transport mechanism and a Synchronous Optical Network (SONET).

Other aspects, features, and advantages of the present invention are disclosed in the detailed description that follows.

DETAILED DESCRIPTION OF THE INVENTION

Figure 1:
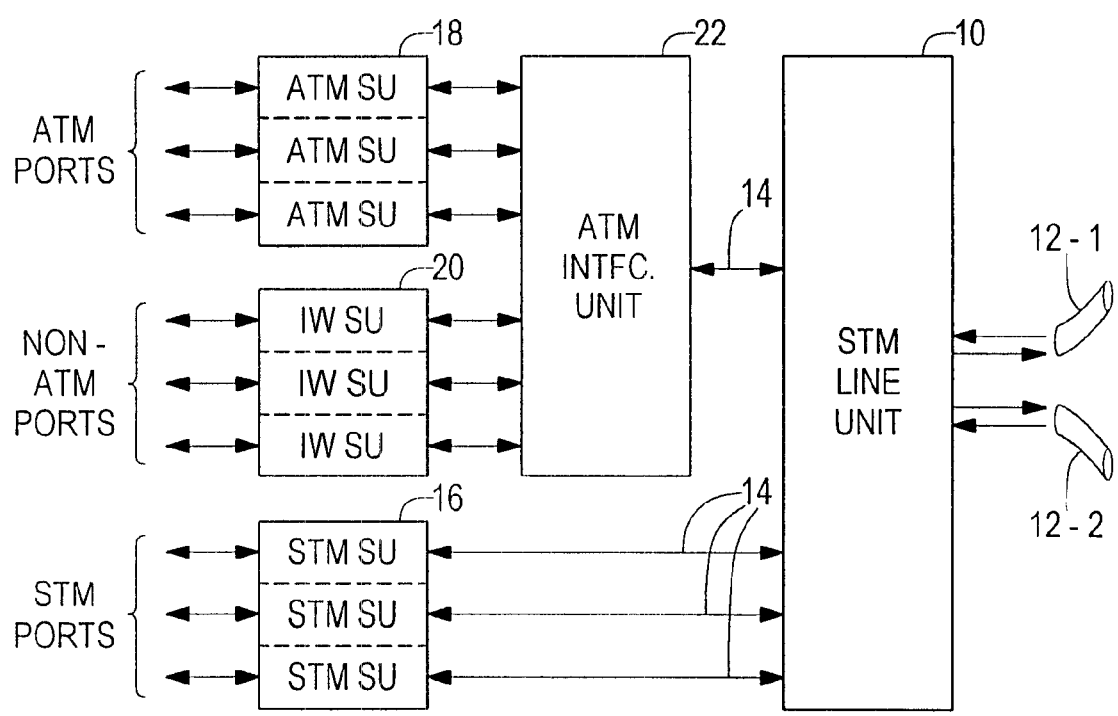
FIG. 1 is a block diagram of an ATM network access device incorporating LAN emulation functionality in accordance with the present invention.

FIG. 1 shows a network device for enabling access to an Asynchronous Transfer Mode (ATM) network running over a Synchronous Optical Network (SONET) transport network. SONET operation is provided by a Synchronous Transfer Mode (STM) line unit 10 interfacing to fiber optic cables 12-1 and 12-2. The cables 12 connect the network device to other devices in the network, for example in separate point-to-point segments or in a ring topology. The STM line unit 10 converts data signals formatted as Synchronous Transport Signal-N (STS-N, where for example N equals 1, 3 or 12), appearing on service-side ports 14, to Optical Carrier-N (OC-N, where for example N equals 3, 12 or 48) on the cables 12. In a known manner, the ATM traffic is mapped to the payloads of the OC-N signals.

The network device includes STM service units (STM SUs) 16 that provide STM interfaces to external devices that require access to the SONET network. The STM service units 16 interface directly with the STM unit 10 via corresponding ones of the service-side ports 14.

The network device also includes ATM service units 18 and Interworking service units 20, which interface to the STM line unit 10 via an ATM switching and interface unit 22. The ATM interface unit 22 provides ATM transport for the ATM service units 18 and the Interworking service units 20, via the STM unit 10 and the SONET network. The ATM service units 18 provide ATM interfaces (using OC-N signalling) to external ATM devices that require access to the SONET network. The Interworking service units 20 provide other types of interfaces to non-ATM devices for inter-network operations. One example of an interworking service unit 20 is a Local Area Network (LAN) service unit, which provides Ethernet interfaces interworked to ATM for transport across the SONET network. As described below, the LAN service unit provides Ethernet bridge functionality and LAN emulation capability.

Figure 2:
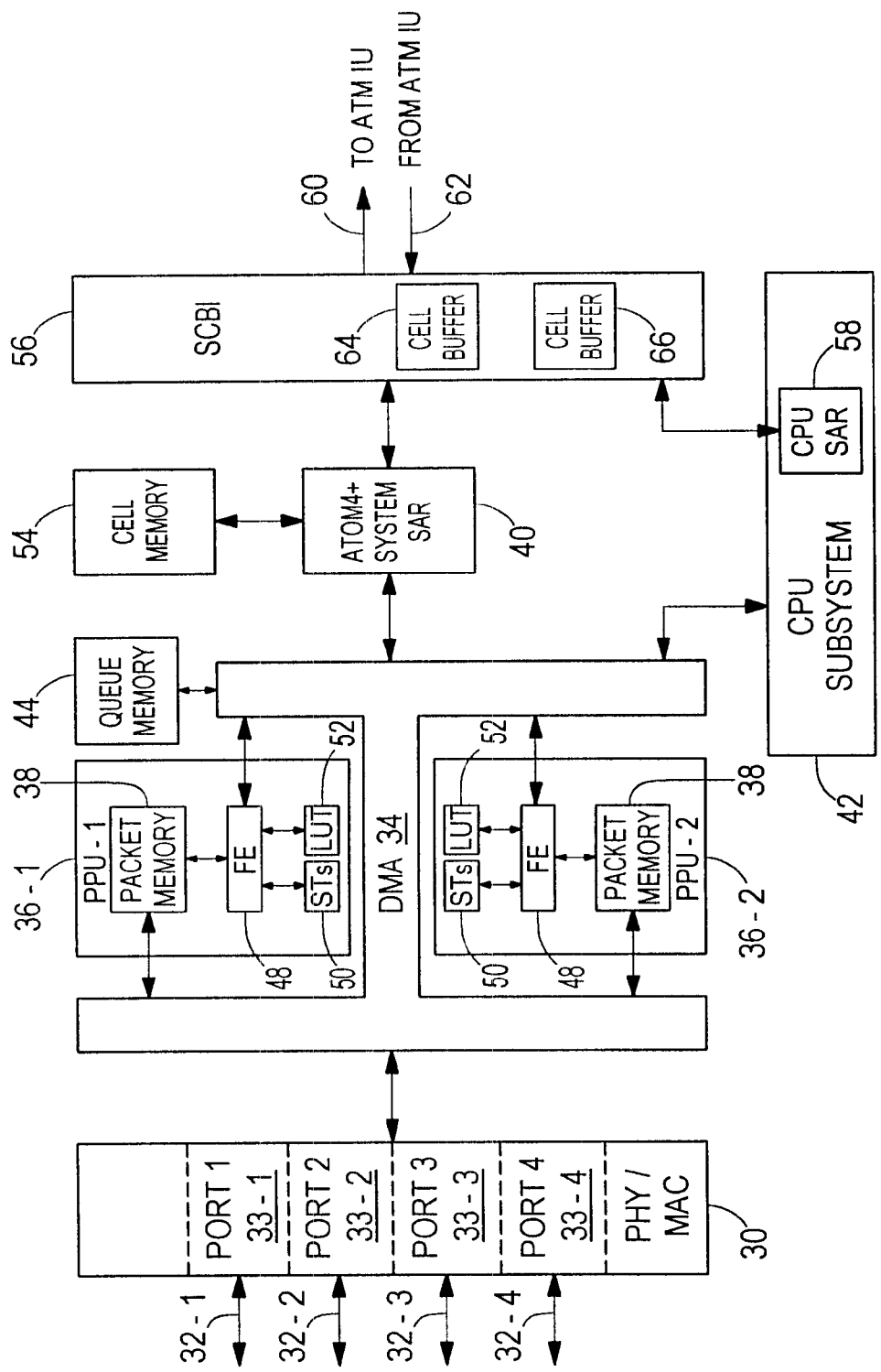
FIG. 2 is a block diagram of a LAN interworking card in the network access device of FIG. 1 in which the LAN emulation functionality is provided.

FIG. 2 shows a block diagram of a LAN service unit, which is one type of interworking service unit 20. PHY/MAC circuitry 30 interfaces to four separate Ethernet transmission lines 32-1 through 32-4 via corresponding ports 33-1 through 33-4. 10BaseT or 100BaseT Ethernet frames are received by the PHY/MAC circuitry 30, and outgoing frames are transmitted in either a full or a half-duplex fashion. The PHY/MAC circuitry 30 properly terminates the transmission media 32 while providing electrical isolation between the media 32 and the remainder of the circuitry on the LAN service unit. For each segment 32, PHY circuitry within the PHY/MAC block 30 performs clock and data recovery, tracks link status, and transfers received frame data to corresponding MAC devices also residing in the PHY/MAC block 30. The MAC devices check frame validity and identify frames that contain errors. Partial frame data is stored in 256 byte receive FIFOs within each MAC device. Each MAC device also contains a transmit FIFO for transmit buffering. The receive and transmit FIFOs for each segment 32 interface to DMA logic 34 used to transfer frames to and from other components on the LAN service unit.

The DMA logic 34 services the receive and transmit FIFOs in the PHY/MAC block 30 on a time division multiplexed access basis. The DMA logic 34 transfers frames between the MAC FIFOs and two packet-processing units (PPUs) 36-1 and 36-2. Specifically, the DMA logic 34 transfers frames to and from packet memory 38 in each PPU 36. The DMA logic 34 contains an internal cross-connect matrix, which allows for flexible assignment of Ethernet ports 33 to the PPUs 36. Each PPU 36 processes two of the four Ethernet ports 33.

The DMA logic 34 also transfers frames between the PPUs 36 and a system segmentation and reassembly (SAR) device 40, such as an AToM4+™ device available from Toshiba, Inc. The DMA logic 34 also provides a communication path between the PPUs 36 and a CPU subsystem 42.

When the DMA logic 34 receives a MAC frame, it creates a Buffer Descriptor and places it in packet memory 38 along with the received frame. The Buffer Descriptor contains information such as Ethernet source port identity, frame length, error status, packet data checksum, etc. The DMA logic manipulates frame pointers on queues in order to "move" the frames from one component to another. The queues are stored in a queue memory 44. The queue memory contains the following queues for each of the four Ethernet ports 33:

1. Host Receive (RX) and Transmit (TX). Used to transfer frames between the PPUs 36 and the CPU subsystem 42.
2. Ethernet RX and TX. Used to transfer frames between the PHY/MAC circuitry 30 and the PPUs 36.
3. SAR RX and TX. Used to transfer frames between the PPUs 36 and the system SAR 40.
4. Free Buffer Pool. Used to keep track of memory buffers that are available to store frame data.

Each PPU 36 contains a Forwarding Engine (FE) 48, which services up to two Ethernet ports 33. Logically, each FE 48 behaves as two separate processing units. Each logical processing unit within an FE 48 can function as either a Permanent Virtual Connection (PVC) based bridge or a LAN Emulation Client (LEC) attached bridge. The LEC bridge functionality is described in detail below.

During receive frame processing, frame pointers are passed between the DMA logic 34 and the FEs 48. Each pointer corresponds to a 128-byte page of packet memory 38. The DMA logic 34 places a frame pointer on the Ethernet RX queue after a frame is fully received by the DMA logic 34. The FE 48 examines the frame pointer, performs frame processing on the corresponding data in packet memory 38, and then instructs the DMA logic 34 to move the frame pointer to the appropriate output queue, such as the SAR TX queue. The FE 48 receives only one pointer per frame to be processed. Additional pointers are stored in the DMA logic 34 to minimize pointer movement; the information the FE 48 needs for processing is contained within the first page of the frame. Once the FE 48 instructs the DMA logic 34 where to place the pointer for a completely processed frame, the DMA logic 34 moves the remainder of the pointers onto the same queue.

Receive frame processing in the FE 48 varies depending on the type of service, e.g. port mapped bridge, 802.1d bridge, or LEC attached bridge. Generally, frame processing commences with the reading of the Buffer Descriptor and MAC header information. The Buffer Descriptor tells the FE which logical processing unit should service the incoming frame, and whether the frame contains an error. During frame processing, the header portion of the frame is manipulated in packet memory 38, while the payload portion of the frame remains static.

Receive frame processing by a FE 48 is considered complete when the FE 48 updates the Buffer Descriptor and writes encapsulation data for the frame back into packet memory 38. The FE 48 updates the Buffer Descriptor by populating a Connection ID (CID) field, setting a frame check sequence (FCS) status bit (preserve or drop), and indicating the offset to the start of frame data from the beginning of a buffer. The encapsulation data is used to form a corresponding frame including the frame payload for transfer over an ATM connection via the system SAR device 40, where the ATM connection to be used is indicated by the value of the CID field.

The apparatus shown in FIG. 2 is capable of implementing up to four logical bridges, two per FE 48. Each FE 48 has two associated search tables (STs) 50 and a Layer2/Layer3 lookup table (LUT) 52. Each ST 50 is a content-addressable memory (CAM) searchable by MAC address. The entries in each ST 50 contain pointers to locations in the LUT 52 associated with the same FE 48. The entries in the LUT 52 in turn contain information describing how frames whose MAC addresses match those of the corresponding ST entries should be processed. For layer 2 (i.e., bridging) processing, the LUT 52 contains the CID, encapsulation type, and other service specific data for the frame.

MAC addresses are retrieved from the packet memory 38 and searched for in the corresponding ST 50. If a pointer to the LUT 52 is present, it is used to retrieve the CID and other information from the LUT 52. This information is used to create the encapsulation data written back into packet memory 38 for the frame. Once frame processing is complete, the frame is placed on the SAR TX Queue to be transferred to the system SAR 40.

There are several exceptions to the above processing scenarios. These exceptions are as follows:

1. Pointers for frames containing errors are returned to the DMA logic 34 by the FE 48. No frame processing is performed by the FE 48. The DMA logic 34 returns the frame pointers to the Free Buffer Queue.
2. The search table lookup indicates that the current frame should be filtered. The frame is discarded by the FE 48.
3. The search table lookup indicates that the frame is destined for the CPU subsystem 42, also referred to as the Host. Bridge Protocol Data Units (BPDUs) are one type of frame that are destined for the Host. In this case, frame data is placed on the Host RX queue rather than the SAR TX queue.
4. The search table lookup indicates a "no match" condition, i.e., the search table 50 has no pointer to the LUT 52 for the MAC address being looked up. The resulting action depends on the type of service at the port. For PVC bridging, the LUT 52 is consulted for a CID of a broadcast Virtual Connection (VC). This CID is placed in the Buffer Descriptor, and the frame is transferred to the system SAR 40 to be sent on the broadcast VC. For LAN Emulation (LANE) bridging, processing is different. Processing for LANE bridging is described below.

Frames destined for the ATM/SONET network are placed on the SAR TX queue for transfer to the system SAR 40. There are four SAR TX queues, one for each Ethernet port 33 (or one per bridge instance). Frames from each SAR TX queue are time-division multiplexed into a single input queue within the system SAR 40. The system SAR 40 segments the frames and stores them as groups of ATM cells on VC queues within a cell memory 54.

In the illustrated embodiment, the cell memory 54 has 4 MB of storage. Each VC queue in the cell memory 54 has a programmable list size, so that the available buffer space can be flexibly assigned among the VCs. The sum total of list sizes for all VCs can be larger than the total amount of available memory space to provide statistical buffer gain. Once a VC queue reaches its programmed limit within the system SAR 40, subsequent frames destined for that VC are dropped.

SCBI logic 56 (where SCBI stands for SAR Coprocessor Backplane Interface) provides an interface between the LAN service unit and the ATM interface unit 22 of FIG. 1. The SCBI logic 56 has one interface to the system SAR 40, and another interface to the CPU subsystem 42. In the illustrated embodiment, these interfaces conform to the UTOPIA standard, which specifies a multi-bit interface that provides efficient transfer of ATM cell data. The CPU subsystem 42 contains its own SAR 58 to facilitate the segmentation and reassembly of frames on multiple VCs required by software executing in the CPU subsystem 42. In a preferred embodiment, the CPU subsystem 42 employs the MPC860SAR microprocessor manufactured by Motorola, Inc.

For Ethernet sourced traffic, the SCBI logic 56 receives cells from the system SAR 40 and transmits them on a high-speed serial transmission line 60 to the ATM Interface Unit 22 of FIG. 1. The SCBI logic 56 also receives cells from the CPU subsystem 42, via the CPU SAR 58, and transmits these cells on the transmission line 60 to the ATM Interface Unit 22.

Cell-based traffic is received from the ATM interface unit 22 over a high-speed serial transmission line 62. The SCBI logic 56 extracts the VPI/VCI and PT (Payload Type) fields of the incoming cells, and uses these values as inputs to a table whose entries indicate the cell type. The action taken depends on the cell type, as follows:

1. A user data cell is translated through a VC Translation Table and stored in a cell buffer 64 for forwarding to the system SAR 40.
2. A LAN emulation control frame (as opposed to an in-band frame) is placed untranslated into a cell buffer 66 for forwarding to the CPU subsystem 42.
3. Management cells are placed untranslated into the cell buffer 66 for forwarding to the CPU subsystem 42.

The system SAR 40 performs AAL5 reassembly of frames from the cells it receives, and checks the integrity of the reassembled frames. In particular, the system SAR 40 checks for and flags the following conditions: (1) frames too large; (2) frames having lengths different from the AAL5 frame length field; and (3) frames having CRC errors. Reassembled frames are placed in frame lists at the frame interface of the system SAR 40. The system SAR 40 attaches a CID, an Encapsulation Type field, and a Bridge ID to the beginning of each frame on the list. These fields are set up within the system SAR 40 by operating software when a new VC is provisioned within the system. The frames and frame lists are stored in the cell memory 54.

The DMA logic 34 transfers frames out of the system SAR 40 in a time division multiplexed access manner. From each frame, the DMA logic 34 forms a Buffer Descriptor based on the CID, Encapsulation Type, Bridge ID, frame length, and the fact that the frame entered from the ATM side of the LAN service unit. The frame is placed on the SAR RX queue for the appropriate logical bridge.

The PPU 36 that receives the frame from the DMA logic 34 processes the frame in a similar manner as for frames received from the Ethernet side. The frame may be destined for either the Ethernet port 33 or Host software executing in the CPU subsystem 42. Outgoing frames encountering a "no match" condition are simply forwarded to the Ethernet port 33 associated with the bridge. Decapsulation processing for multiprotocol encapsulation and LANE bridging is performed. Processed frames are placed on either the appropriate Ethernet TX Queue or the Host RX Queue.

The DMA logic 34 forwards outgoing frames to MAC controllers in the respective ports 33 within the PHY/MAC circuitry 30. Each MAC controller contains a 256-byte transmit FIFO used to buffer outgoing frames. The DMA logic transfers frames into the transmit FIFO from the packet memory 38. Whenever data is available in a MAC transmit FIFO, the corresponding PHY transmits the data onto the Ethernet media 32.

Figure 3:
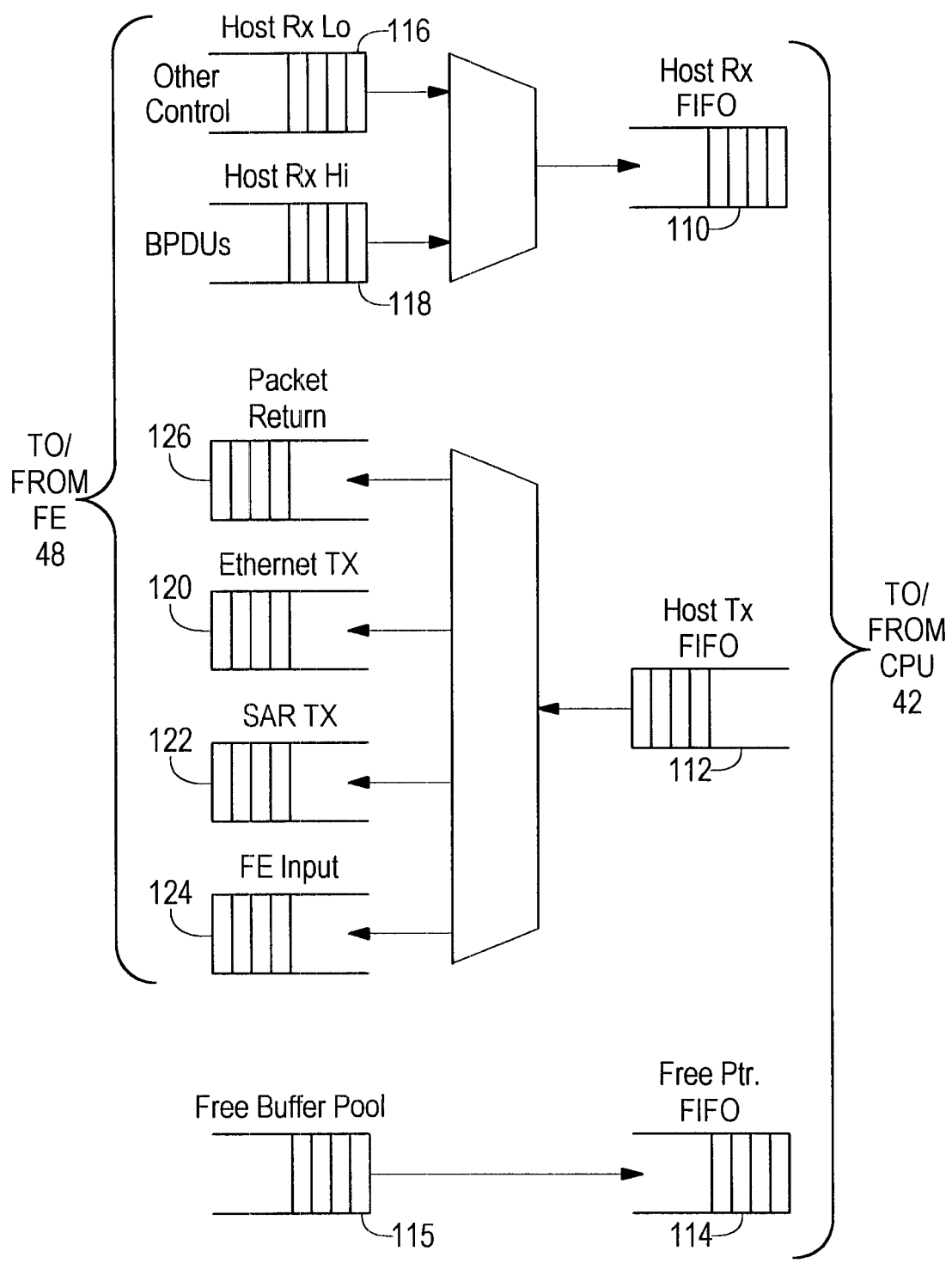
FIG. 3 is a diagram of several queues used in the LAN interworking card of FIG. 2 as part of the LAN emulation functionality.

FIG. 3 illustrates in more detail several receive and transmit queues used for communication between the CPU 42 and the FEs 48 of FIG. 2. Three first-in-first-out (FIFO) structures are used: a Host Rx FIFO 110, a Host TX FIFO 112, and a Free Pointer FIFO 114. The Host Rx FIFO receives its data from either a Host Rx Low Priority Queue 116 or a Host Rx High Priority Queue 118. The source of this traffic is an FE 48. The FE 48 examines received frames and, based on the frame type, determines their proper destinations. Control frames are directed to the CPU 42. High priority traffic, such as Bridge Protocol Data Units (BPDUs), are placed on the Host RX High Priority Queue 118, and serviced ahead of any PDUs that may be residing in the Host RX Low Priority Queue 116. Other control frames, such as LANE Flush frames, are placed on the Host RX Low Priority Queue 116, which is serviced only when no traffic exists on the Host RX High Priority Queue 118.

Periodically, BPDUs are exchanged among all the bridges in the network to facilitate the organization of a proper bridging topology, which is referred to as a spanning tree topology. The aim is to avoid the creation of undesirable loops in the network that can cause frames to be circulated indefinitely. Each bridge uses the information contained in the BPDUs to enable and disable selected ports in accordance with a spanning tree algorithm. If BPDUs are lost, the spanning tree algorithm reacts by creating additional connectivity, and loops may be created. Therefore, it is important that BPDUs not be lost or discarded.

The use of separate high and low priority queues helps reduce the chances of BPDUs being discarded. BPDU traffic is separated from the rest of the control traffic and sent to the CPU via the Host RX High Priority Queue 118. Even if the volume of control traffic is high enough to cause the Host RX Low Priority Queue 116 to overflow, causing loss of control PDUs, the loss of BPDUs is minimized.

FIG. 3 also shows the mechanisms for the CPU 42 to transmit frames to an FE 48. A Free Pointer FIFO 114 holds a cache of pointers that point to free buffers within packet memory 38. The pointers on the Free Pointer FIFO 114 are taken from a Free Buffer Pool 115. The CPU 42 takes pointers off the Free Pointer FIFO 114 and uses these to place blocks of data to be transmitted into packet memory 38. As described above, the CPU 42 creates frames with buffer descriptors, each buffer descriptor indicating one of several destination queues for which the corresponding frame is destined. Pointers for these frames are placed on a Host TX FIFO 112. The destination queues include an Ethernet TX queue 120 for frames destined for an Ethernet segment 32, and a SAR TX queue 122 for frames destined for the ATM network. The FE 48 inserts these frames into the outgoing traffic on behalf of the CPU 42. Examples of traffic generated by the CPU 42 are BPDUs and LANE Flush frames. An FE Input queue 124 is used to pass PDUs between the CPU 42 and an FE 48.

When the CPU 42 finishes with pointers it has received from the Host RX Queue 110, it returns them to the overall buffer pool by placing the pointers into a Packet Return Queue 126.

An Unknown Host Queue is used for passing certain information between an FE 48 and the CPU 42. One instance of the Unknown Host Queue resides in each LUT 52 of FIG. 2 for each bridge. When a frame is received containing a destination MAC address for which no matching address in the ST 50 is found, the unknown MAC address is placed on the Unknown Host Queue for the CPU 42. The CPU 42 executes an address resolution process to obtain a mapping from the destination address to a VC on which frames containing the address should be forwarded. This operation is described in more detail below.

Figure 4:
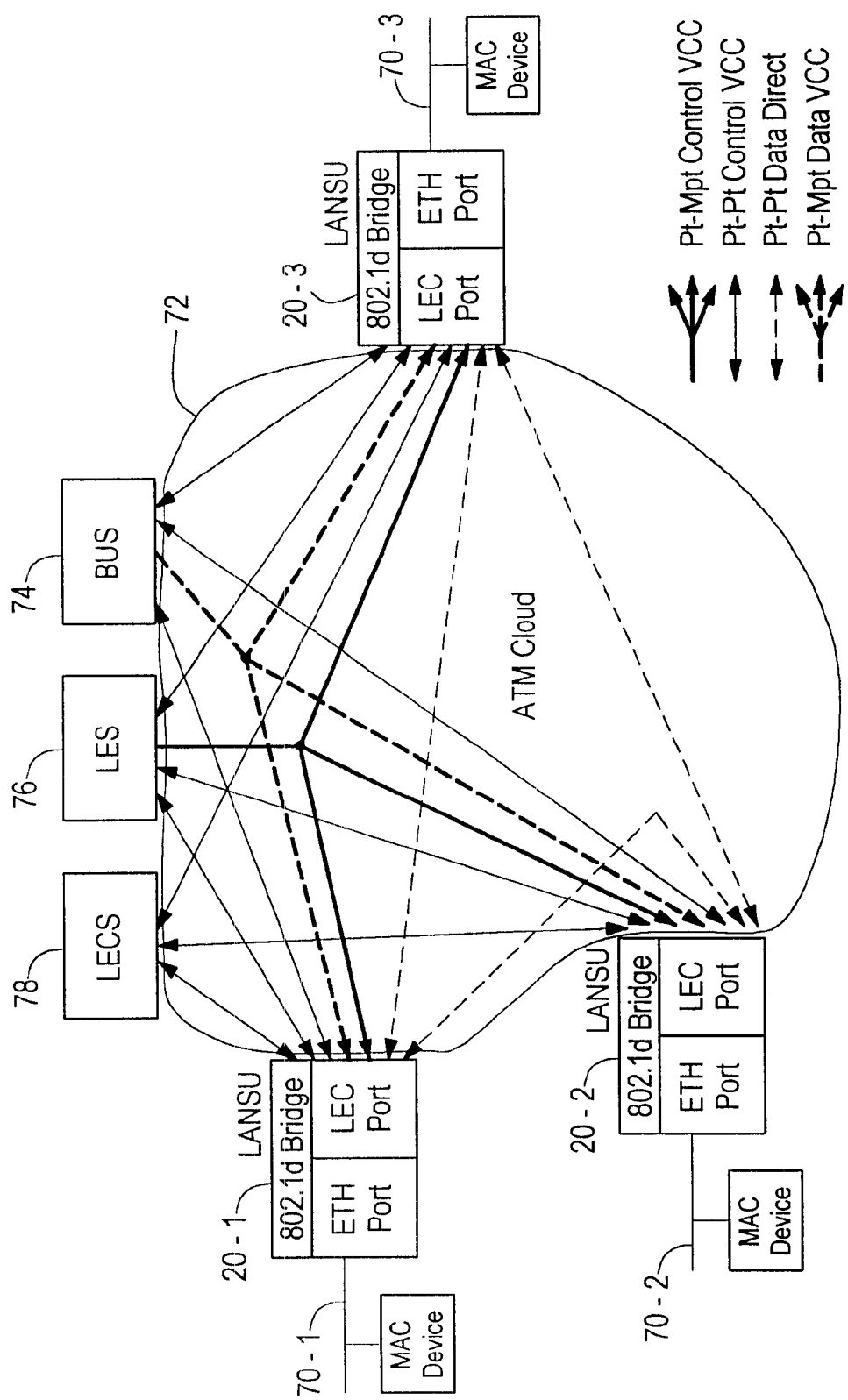
FIG. 4 is a block diagram of a LAN emulation system in which the network access device of FIG. 1 is used.

FIG. 4 is a representation of a system for emulating a LAN over an ATM network. The emulated LAN or ELAN includes three LAN segments 70-1, 70-2 and 70-3. Each LAN segment 70 interfaces to a corresponding LAN interworking service unit or LANSU 20, each of which includes a bridge with an Ethernet port and a LAN Emulation Client (LEC) port. The LANSUs 20 are interconnected by an ATM network shown as an "ATM cloud" 72. Physically, the ATM cloud 72 includes the ATM interface unit 22, the STM line unit 10 and the fiber cables 12 of FIG. 1.

The ELAN includes a Broadcast and Unknown Server (BUS) 74, a LAN Emulation Server (LES) 76, and a LAN Emulation Configuration Server (LECS) 78. The LECS 78 provides network configuration data to LECs within the LANSUs 20. The BUS 74 distributes broadcast and unknown frames to the LECs within the ELAN on behalf of a requesting LEC. The LES 76 provides address resolution functionality, which is the mapping of MAC destination addresses to the ATM addresses of LANSUs 20 in the ATM network 72 via which the MAC addresses can be reached.

The various LANE elements in FIG. 4 are interconnected by several Virtual Channel Connections (VCCs) as shown. These connections generally follow the LANE model of the aforementioned ATM Forum specification for LANE over ATM.

Figure 5:
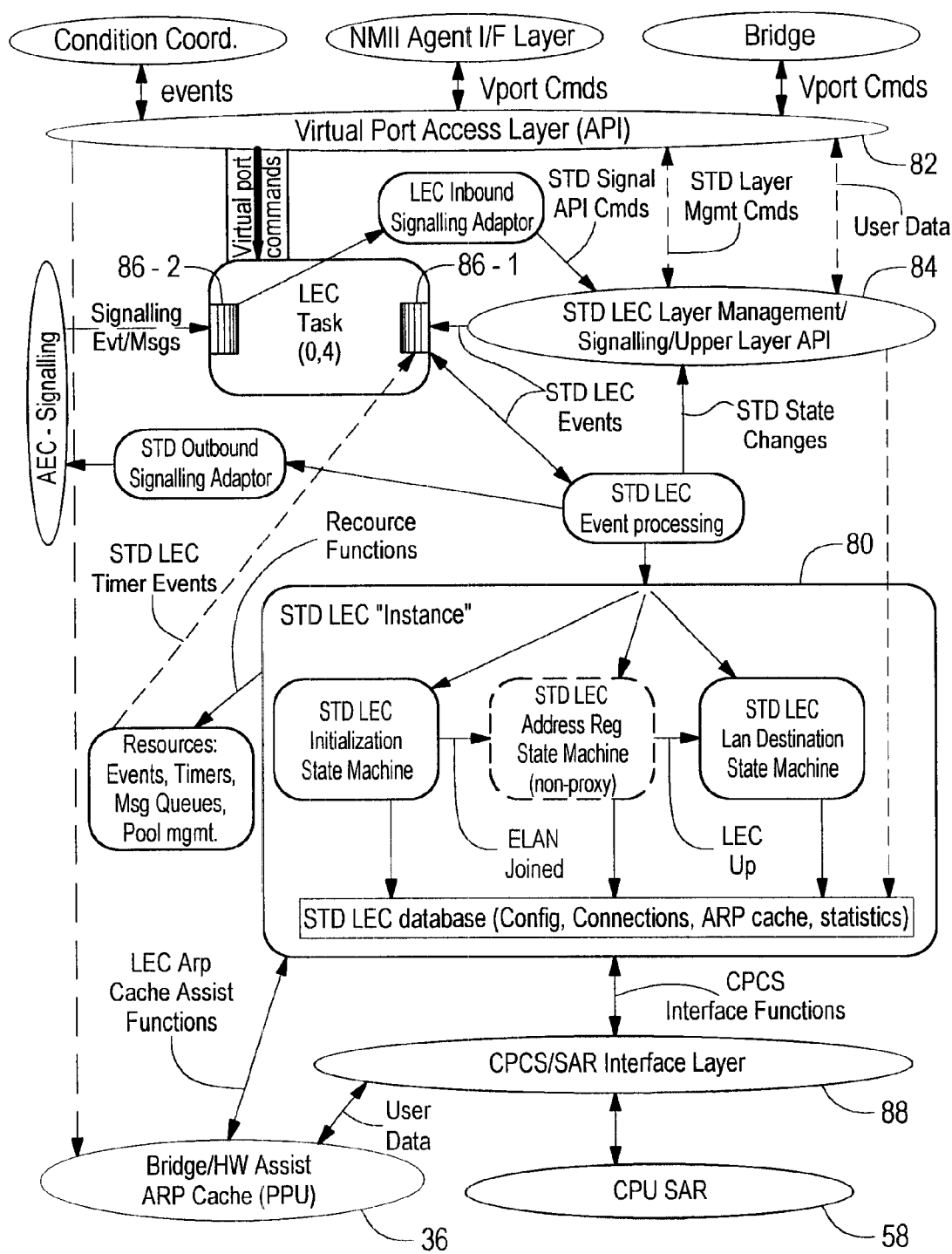
FIG. 5 is a block diagram of a LAN emulation client (LEC) software subsystem residing on the LAN interworking card of FIG. 2.

FIG. 5 shows the functional organization of LAN Emulation Client (LEC) software that executes in the CPU subsystem 42 of FIG. 2. There are separate instances of the illustrated LEC software for each of the four bridges that may reside on a given LAN Interworking card 20. In the illustrated embodiment, the LEC software includes an instance 80 of standard LEC software such as available from Harris & Jeffries, Inc., of Dedham, Mass., USA. Several additional functional modules are also included, such as a virtual port access layer API 82, a management and signalling layer 84, task queues 86, and an ATM AAL5 Common Part Convergence Sublayer (CPCS) interface 88. At the virtual port access API 82, the LEC software appears as a virtual port of a virtual bridge implemented primarily by a PPU 36 as described above. The LEC software uses a standard Q.2931 signaling interface, referred to as Application End System Signalling Client or AEC. At the lower level, the LEC software has interfaces to a PPU 36 and the CPU SAR 58 of FIG. 2 for frame transport and related activities.

As shown, the standard LEC 80 has only one CPCS interface. One of the tasks of the CPCS layer 88 is to direct messages to either the PPU 36 or the CPU SAR 58, depending on the type of message. Most LAN emulation (LANE) control messages are transferred over the ELAN via the CPU SAR 58. However, as described below some LANE control messages are "in-band" control messages sent over data VCs, and must be transferred using the system SAR 40 of FIG. 2. These in-band control messages are transferred between the LEC software and the PPU 36 using the various queues described above with reference to FIG. 3. The PPU 36 forwards outgoing in-band control messages to the system SAR 40 on behalf of the LEC software. Incoming in-band control messages received by the PPU 36 are forwarded to the LEC software using the queues of FIG. 3 and the CPCS layer 88. These messages appear to the LEC software as coming directly from the system SAR 40, due to the redirection function of the CPCS layer 88.

Figure 6:
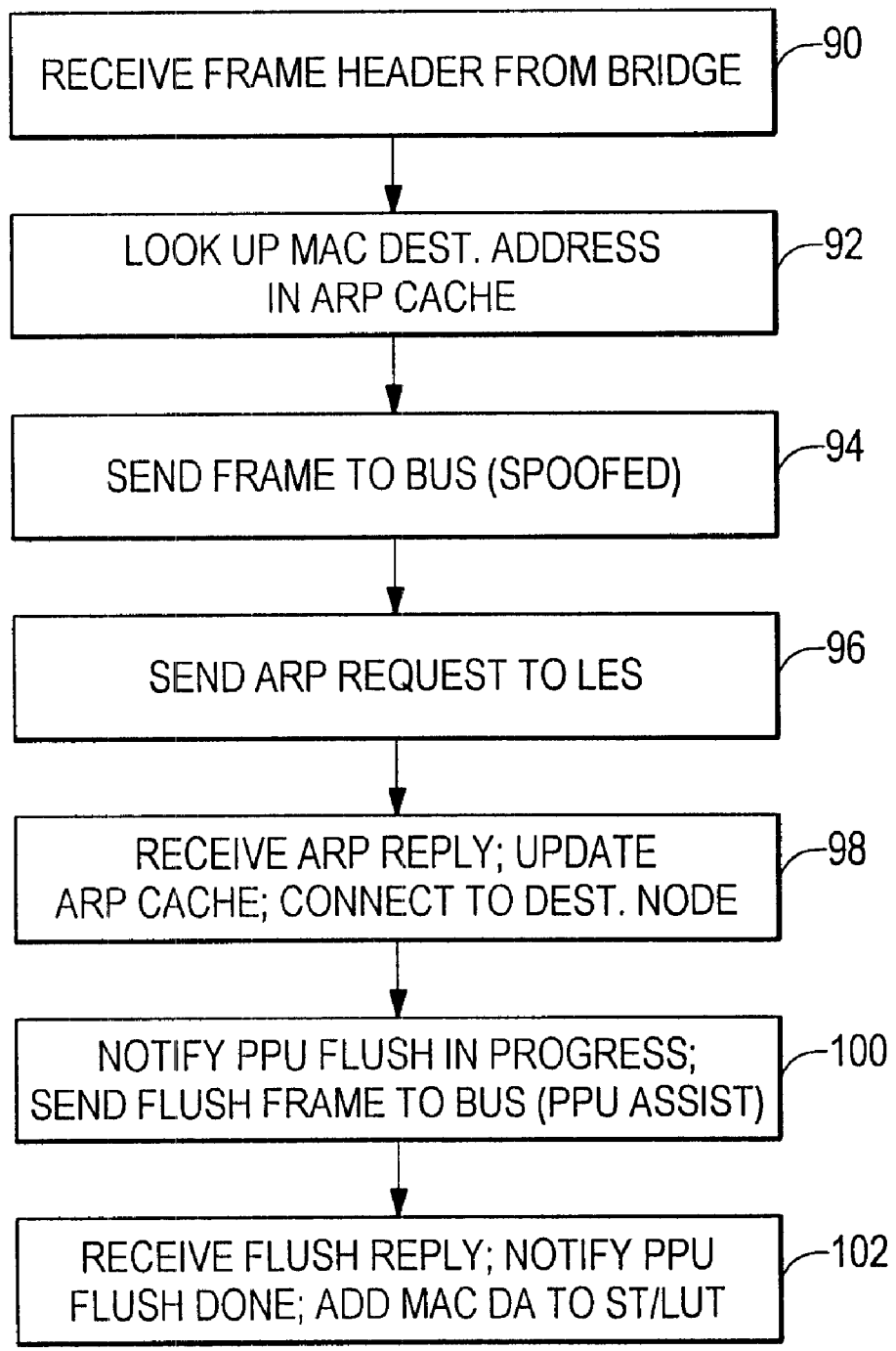
FIG. 6 is a flow diagram showing one aspect of operation of the LEC software of FIG. 5.

FIG. 6 is a flow diagram depicting the operation of the LEC software when an "unknown" frame is received from an Ethernet Port 33. The header of the unknown frame is passed from the FE 48 to the CPU 42 using the Unknown Host Queue in the LUT 52, as described above. At step 90, the header only of the frame is written to the virtual port access API 82 by bridge software driver servicing the Unknown Host Queue from the PPU 36. This write is posted to a Task Queue 86-1 for LEC events via the virtual port access API 82. The non-header portion of the frame is not needed, because the PPU retains responsibility for forwarding the frame to the BUS 74 for broadcasting on the emulated LAN. However, the LEC software is responsible for "resolving" the MAC destination address (DA), i.e., ascertaining the address of another LEC in the ATM network via which the destination MAC address can be reached. This resolving process is referred to by the acronym "LE_ARP", which means LAN Emulation Address Resolution Protocol. In order to carry out the address resolution process, the LEC software needs information from the frame header, but not the rest of the frame.

The standard LEC 80 recognizes the writing of the frame header as an "event", and proceeds to step 92 of FIG. 6. The MAC DA is used to look up an entry in a table of address resolution mappings, referred to in FIG. 6 as the ARP cache. This table is maintained in a database within the standard LEC 80, and it is different from the tables maintained within the PPUs 36 for the same purposes. The ARP cache contains mappings from MAC DAs to ATM addresses and VCs, based on the configuration of the ELAN.

In the presumed case of an unknown DA, it is assumed that the ARP cache lookup indicates a "no match" or a miss condition. The ARP cache miss causes the standard LEC 80 to proceed to step 94, in which program code is executed that would normally cause the frame to be forwarded to the BUS 74 of FIG. 4. The standard LEC 80 prepares a frame containing the frame header received from the PPU 36, and this prepared frame is transferred from the standard LEC 80 to the CPCS layer 88. However, as previously mentioned, the job of forwarding unknown frames to the BUS 74 is performed by the PPU 36 rather than the LEC software. One of the functions of the CPCS layer 88 is to "spoof", or fool, the standard LEC 80 into believing that the frame has been forwarded to the BUS 74 in response to the execution of the frame-forwarding code in the standard LEC 80. When the standard LEC 80 executes the frame-forwarding program code, the CPCS/SAR layer 88 does not pass the frame-forwarding request along to the system SAR 40. However, the standard LEC 80 has correctly been made to believe that the frame has been forwarded, even though the forwarding has been accomplished by the PPU 36 rather than by operation of the standard LEC 80.

In step 96, the standard LEC 80 issues an LE_ARP request to the LES 76 in order to obtain the address resolution mapping for the unknown frame. This request is passed to the CPCS layer 88, which forwards the request on a VC, referred to as the "LES VC", previously provisioned between the LEC and the LES 76. Being a control message, the LE-ARP request message is transferred via the CPU SAR 58.

At step 98, the standard LEC 80 receives an LE_ARP reply message from the LES 76, which is signaled via the Task Queue 86-1. The LE_ARP reply contains the ATM address of a remote LEC via which the destination address contained in the LE_ARP request can be reached. The standard LEC 80 updates the ARP cache in its database. If a connection to the remote LEC does not already exist, the standard LEC 80 establishes a new data direct virtual connection (VC) to the remote LEC through the ATM network. The LEC software also creates an address resolution binding that maps the MAC address to the existing or new VC.

Steps 100 and 102 represent the execution of a so-called "flush protocol", which is used to maintain frame ordering when a MAC DA transitions from unknown to known. When the transition occurs, all unknown frames with the same MAC DA previously delivered to the BUS 74 must be delivered to the destination LAN segment 70 (FIG. 4) before any new frames can be forwarded directly to the destination LAN segment 70 using the now-known VC. In step 100, the LEC software first notifies the PPU 36 that a flush is in progress. In response, the PPU 36 refrains from forwarding any frames it may receive that have the now-known DA, until the flush sequence is complete. If many such frames are received, the PPU 36 may also discard frames containing this MAC DA until the flush sequence has completed.

The standard LEC 80 then generates a FLUSH frame and passes it to the CPCS layer 88 for delivery to the BUS 74. The CPCS recognizes the FLUSH frame as an in-band control frame, and passes it to the PPU 36 rather than to the CPU SAR 58. The PPU 36 forwards the frame on the BUS VC on behalf of the LEC software.

Step 102 is executed upon receipt of a FLUSH REPLY frame, which is sent from the LES 76 on a control direct VC and received by the LEC software via the CPU SAR 58. The standard LEC 80 then notifies the PPU 36 that the flush sequence has ended. The PPU 36 is provisioned with the binding between the MAC DA and the data direct VC on which frames containing the MAC DA are to be forwarded. This binding is stored in the ST 50 and the LUT 52. The LEC also registers with the PPU 36 for receiving in-band control messages. At this point, the PPU 36 has the information it needs to forward subsequent frames containing the known MAC DA without the assistance of the LEC software.

When a data direct VC has been newly established, the LEC receives a Ready Query message from the remote LEC approximately in parallel with the execution of step 102. The Ready Query is used by the remote LEC to ensure that a connection has been successfully established before sending any data frames, to avoid the loss of prematurely sent frames. The PPU 36 receives the Ready Query frame and forwards it to the LEC software via the above-described queues. The standard LEC 80 processes the event and returns a Ready Indication message back to the PPU 36, which in turn forwards the message to the remote LEC on the data direct VC via the system SAR 40. Once the remote LEC has received the Ready Indication, it is free to send data frames on the new data direct VC.

Methods and apparatus for LAN emulation have been described. It will be apparent to those skilled in the art that modifications to and variations of the above-described technique are possible without departing from the inventive concepts disclosed herein. Accordingly, the invention should be viewed as limited solely by the scope and spirit of the appended claims.

What is claimed is:

1. Local area network (LAN) emulation apparatus, comprising:
    LAN interface logic operative to receive frames from a LAN segment, each received frame containing a destination address (DA) identifying a destination node on an emulated LAN to which the frame is to be forwarded;
    frame transport logic operative to transfer frames to and from a connection-based network such that each frame is transferred as a collection of one or more messages each containing an identifier of a connection in the connection-based network via which the frame can reach a desired destination node;
    forwarding logic operative to:
        (i) determine whether a mapping exists between the DA of each received frame and an identifier of a connection in the connection-based network via which the destination node can be reached, the DA being referred to as "known" when such a mapping exists and as "unknown" otherwise;
        (ii) forward each received frame containing a known DA to the frame transport logic for transfer to the connection-based network using the connection identifier to which the known DA is mapped; and
        (iii) for each received frame containing an unknown DA, pass the unknown DA to a LAN emulation client (LEC) processor to establish a connection identifier mapping for the unknown DA, and forward the received frame to the frame transport logic to be transferred to the connection-based network using an identifier of a connection via which a broadcast and unknown server (BUS) in the connection-based network can be reached to broadcast the frame on the emulated LAN; and
    a LAN emulation client (LEC) processor operative, for each unknown DA received from the forwarding logic, to:
        (i) create a LAN emulation address resolution protocol (LE_ARP) request message containing the unknown DA, and pass the LE_ARP request message to the frame transport logic for transfer to the connection-based network using an identifier of a connection via which a LAN emulation server (LES) in the connection-based network can be reached; and
        (ii) upon receiving an LE_ARP reply message from the LES, establish a connection in the connection-based network via which the destination node can be reached, the connection being established using an address returned in the LE_ARP reply message, and notify the forwarding logic of the new connection for the DA for use in forwarding subsequently received frames.

2. LAN emulation apparatus according to claim 1, wherein the LEC processor is further operative, upon receiving the LE_ARP reply, to notify the forwarding logic that a flush operation is in progress and to send a flush frame to the forwarding logic for transfer to the BUS, and upon receiving a flush reply signifying the end of the flush operation, to notify the forwarding logic that the flush operation has ended, and wherein the forwarding logic is further operative to refrain from passing frames containing the unknown DA to the frame transport logic during the flush operation.

3. LAN emulation apparatus according to claim 1, wherein the forwarding logic is operative to notify the LEC processor of received ready query messages from a remote LEC on the new connection, and at the request of the LEC processor to forward ready indication frames to the frame transport logic for transfer to the remote LEC.

4. LAN emulation apparatus according to claim 1, wherein the LEC processor is further operative in response to receiving an unknown DA from the forwarding logic to prepare a frame containing the unknown DA for sending to the BUS to initiate LE_ARP procedures, and to subsequently discard the prepared frame without having sent the frame to the BUS.

5. LAN emulation apparatus according to claim 1, wherein the frame transport logic includes two separate segmentation and reassembly (SAR) logic blocks via which frames are transferred to and from the connection-based network, a first one of the SAR logic blocks being used to transfer frames between the forwarding logic and the connection-based network, and a second one of the SAR logic blocks being used to transfer selected frames between the LEC processor and the connection-based network.

6. LAN emulation apparatus according to claim 1, wherein the connection-based network is an Asynchronous Transfer Mode (ATM) network.

7. LAN emulation apparatus according to claim 6, wherein the ATM network is layered on a Synchronous Transfer Mode (STM) transport network, and further comprising ATM to STM interface circuitry operative to provide ATM network functionality over the STM network.

8. LAN emulation apparatus according to claim 1, wherein the LAN is an Ethernet LAN.

* * * * *

UNITED STATES PATENT AND TRADEMARK OFFICE
CERTIFICATE OF CORRECTION

PATENT NO.    : 6,456,962 B1
DATED         : September 24, 2002
INVENTOR(S)   : Jon Allingham et al.

It is certified that error appears in the above-identified patent and that said Letters Patent is hereby corrected as shown below:

Column 11,
Line 5, "LE-ARP" should read -- LE_ARP --.

Signed and Sealed this

Fourteenth Day of October, 2003

JAMES E. ROGAN
*Director of the United States Patent and Trademark Office*